June 15, 1965 V. T. LEGGE 3,188,788
LAWN MOWERS
Filed July 8, 1963 4 Sheets-Sheet 1
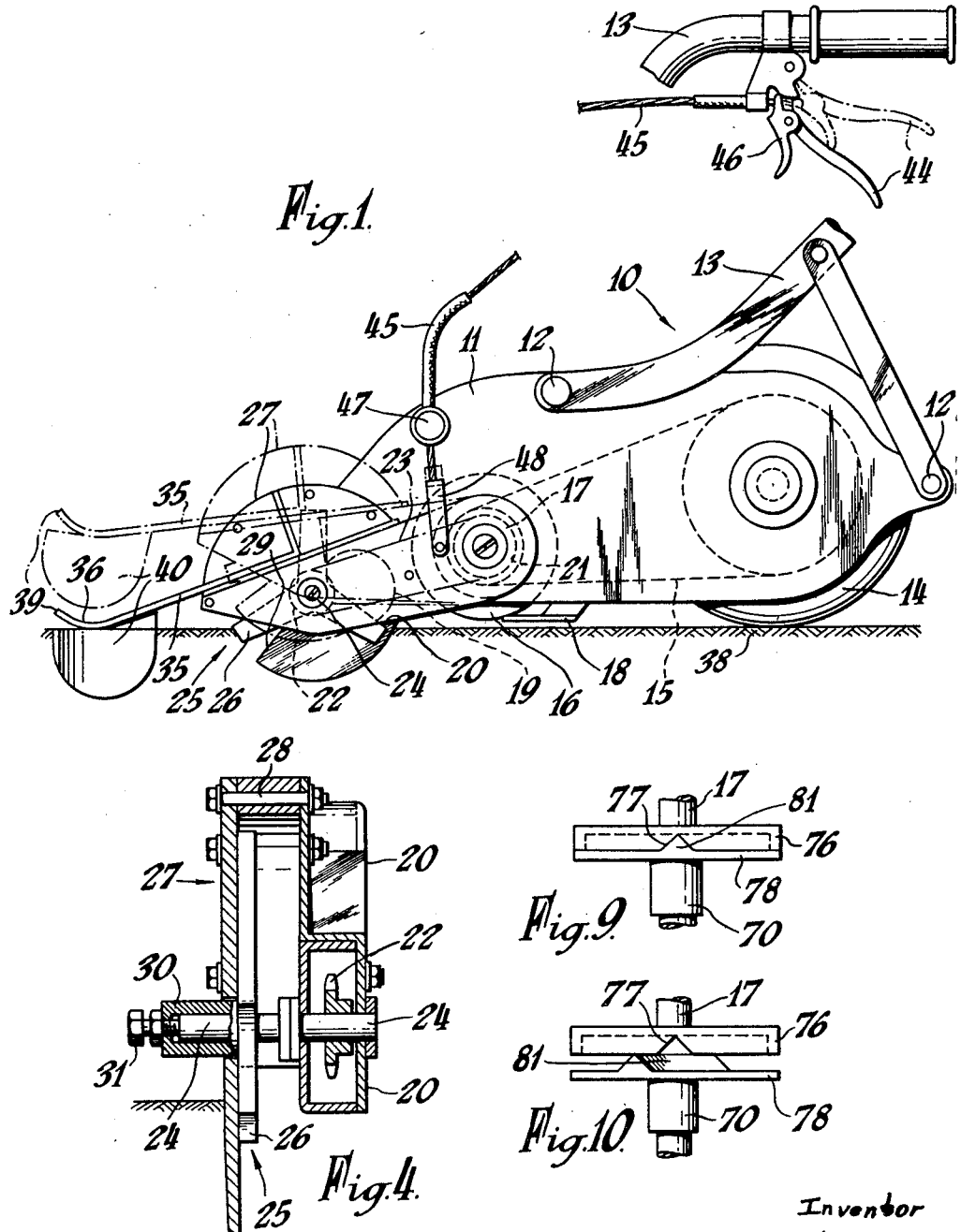
Inventor
Victor Taylor Legge
By Stevens, Davis, Miller & Mosher
Attorneys June 15, 1965
V. T. LEGGE
3,188,788
LAWN MOWERS
Filed July 8, 1963
4 Sheets-Sheet 2
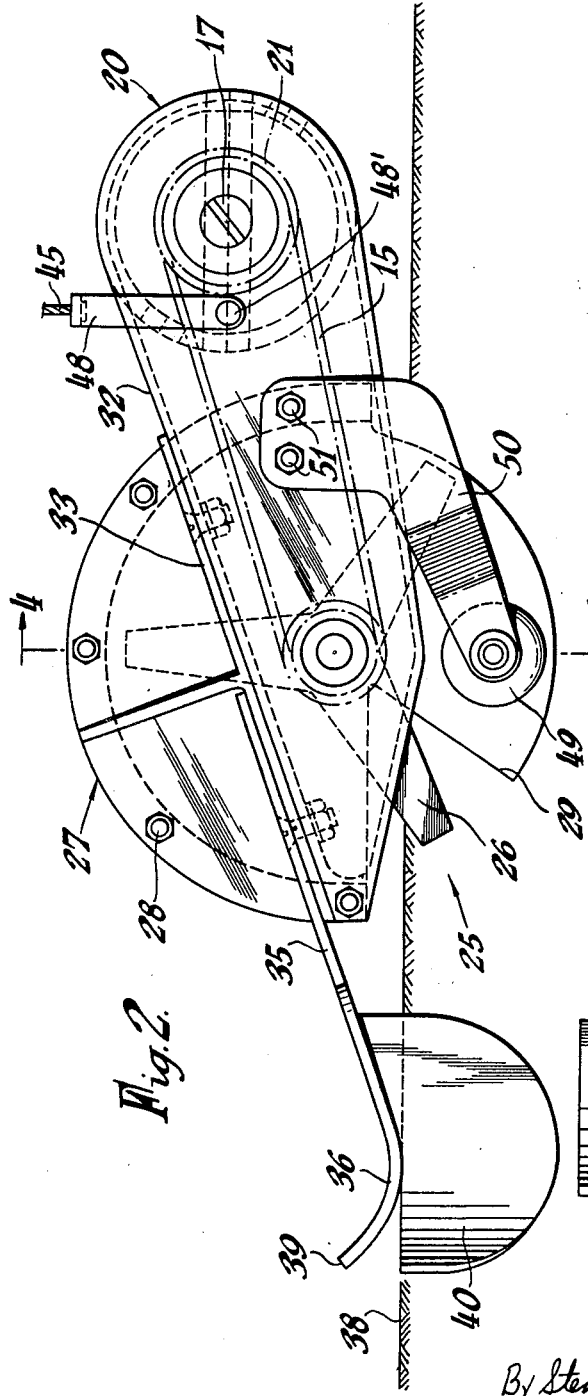
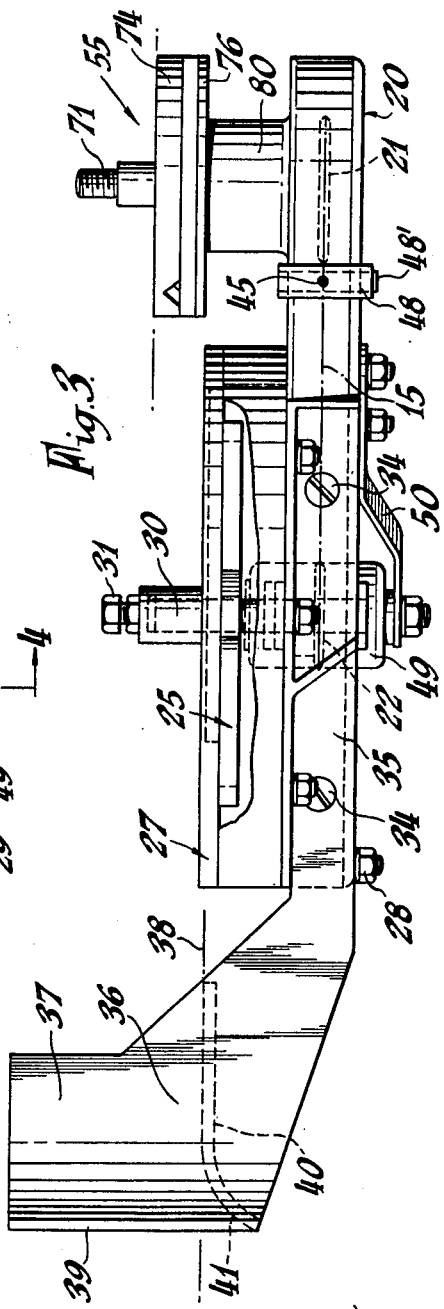
Inventor
Victor Taylor Legge
By Stevens, Davis, Miller & Mosher
Attorneys June 15, 1965 V. T. LEGGE 3,188,788
LAWN MOWERS
Filed July 8, 1963 4 Sheets-Sheet 3
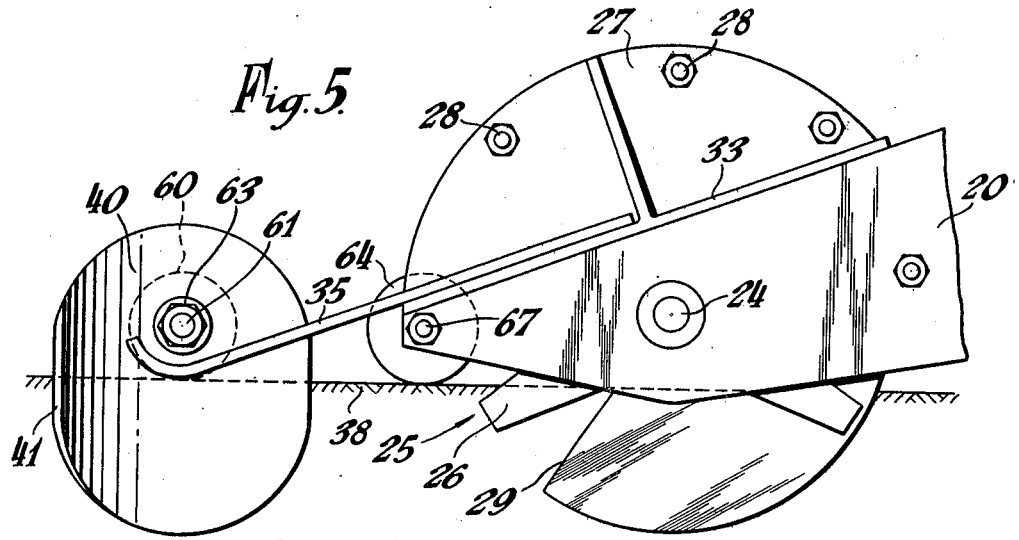
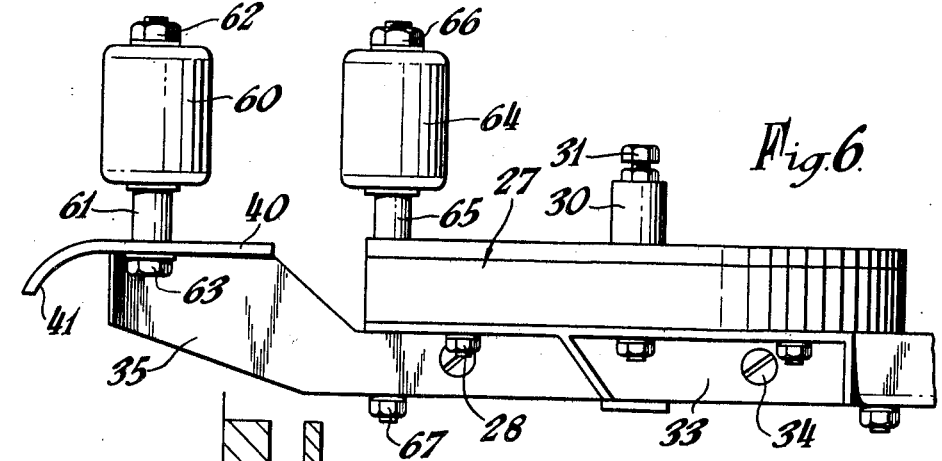
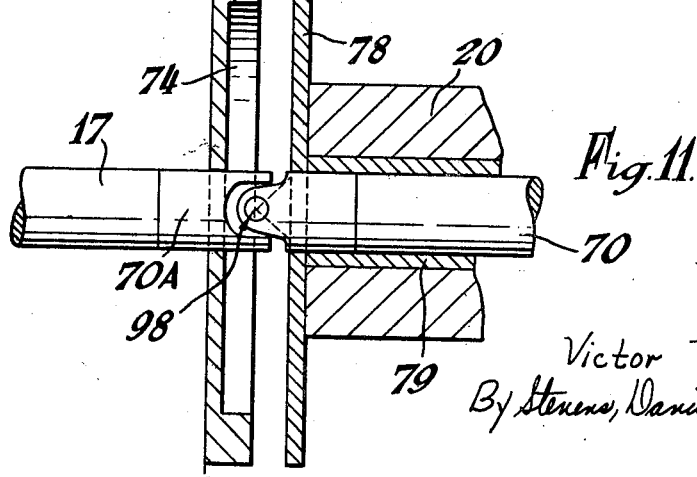
Inventor
Victor Taylor Legge
By Stevens, Davis, Miller & Mosher
Attorneys June 15, 1965 V. T. LEGGE 3,188,788
LAWN MOWERS
Filed July 8, 1963 4 Sheets-Sheet 4
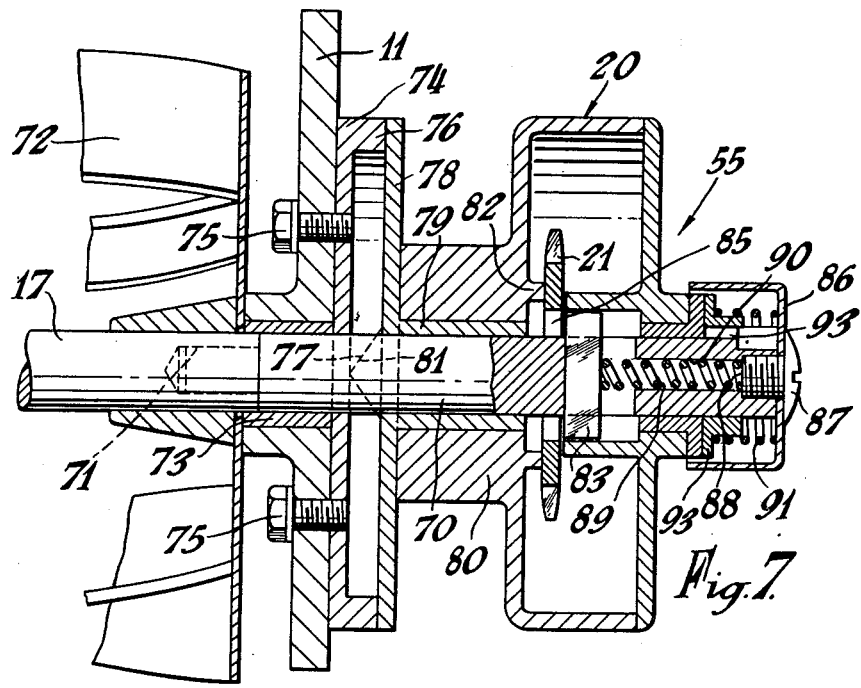
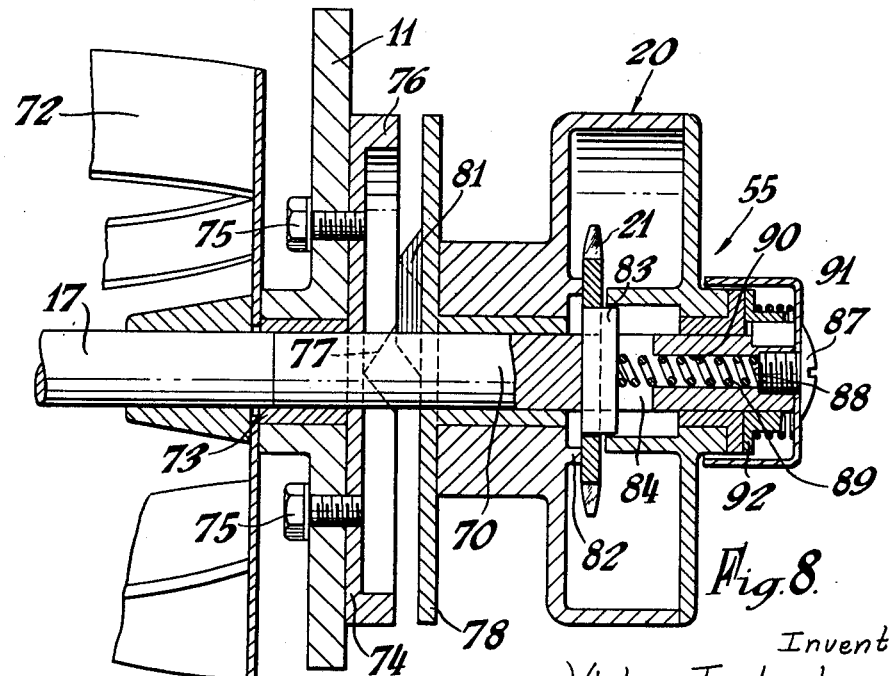
Inventor
Victor Taylor Legge
By Stevens, Davis, Miller & Mosher
Attorneys

United States Patent Office 3,188,788
Patented June 15, 1965

3,188,788
LAWN MOWERS
Victor Taylor Legge, 3 Blandford Road, St. Albans,
Hertfordshire, England
Filed July 8, 1963, Ser. No. 293,522
Claims priority, application Great Britain, July 9, 1962,
26,302/62; Jan. 11, 1963, 1,426/63; Mar. 5, 1963,
8,720/63
9 Claims. (Cl. 56—26)

This invention relates to lawn mowers and in particular, but not exclusively, to lawn mowers of the kind described and claimed in my British Patent No. 840,723. The lawn mower of this prior patent is provided with an attachment device whereby the edge of a lawn may be trimmed simultaneously with the cutting of the main surface of the lawn by the main cutting unit. The edge trimming device essentially comprises an auxiliary cutting assembly which is carried by a casing of the lawn mower and is driven from the main cutter shaft by driving means located in the casing. The driving means comprises at least one driving and one driven member and the casing or a part thereof is rotatably mounted about the axis of one of the said members for movement from a lowered operative position to a raised inoperative position. The movement of the casing carrying the auxiliary cutting assembly is controlled by a manually operable control device and the lowered operative position of the casing is determined by stop means which engage and support the casing.

The edge trimming device as described in my prior patent works satisfactorily and is extremely efficient on relatively smooth and well-kept lawns. I have now discovered however that the operation of the trimming device is not efficient on rough ground and in particular grass areas where the edge is not well defined. In other instances where the grass surface is not particularly flat I have discovered that undulations of the grass surface in the direction of travel cause the lawn mower to vary its position which, due to the provision of the stop means for the cutting assembly, simultaneously varies the positioning of the trimming device. I have also discovered that rocking movement of the lawn mover, in a plane at right angles to the direction of travel of the lawn mower similarly varies the positioning of the auxiliary cutting assembly so that the trimming device does not remain square with the edge of the lawn. As a result the trimmer may not operate efficiently if the main surface of the lawn is at all rough or undulating.

It is accordingly an object of the present invention to provide an improved stop or guide device for controlling the position of the auxiliary cutting assembly irrespective of the movement of the lawn mower in response to undulations in the grass surface.

It is a further object of the invention to provide an improved drive for the auxiliary cutting assembly whereby the trimmer will remain square with the edge of the lawn irrespective of rocking movements of the lawn mower in a plane at right angles to the direction of travel.

According to the invention the casing containing the auxiliary cutting assembly is provided with a support member attached thereto or formed integrally therewith. The support member extends forwardly, backwardly or centrally therefrom and is adapted to engage along and/or over the edge of the lawn. The movable casing containing the auxiliary cutting assembly is therefore supported in its operative position by the support member which determines its position in relation to the lawn edge irrespective of variations in the position of the lawn mower.

According to a further aspect of the invention a universal joint is provided in the drive mechanism between the main cutter shaft of the lawn mower and the auxiliary cutting assembly.

It will be appreciated that the edge trimming device as described above is at all times operatively driven in accordance with the operation of the main cutting shaft of the lawn mower irrespective of whether the edge trimming device is being used or not. It is accordingly a further object of the application to provide an improved arrangement which permits the edge trimming device to be rendered inoperative when moved to its uppermost or inoperative position. Yet another object of the invention is to provide a driving arrangement for an edge trimming device which is rendered inoperative when the edge trimming device is rotated or otherwise moved to its uppermost or inoperative position by a manually or foot operable control device.

In accordance with this aspect of the invention the edge trimming device is mounted within a casing rotatable by a manually or foot operable control device about a driving shaft extending from or within the casing of the lawn mower. The driving shaft of the lawn mower preferably comprises the main cutter shaft but if desired the edge trimming device may be driven from any other auxiliary driving shaft such as the shaft of the rear rollers. The edge trimming device includes a driven shaft coupled with the driving shaft of the lawn mower and having a driving key or like member mounted thereon for driving engagement with a sprocket forming part of the driving mechanism of the edge trimming device. The sprocket is movable by the casing of the edge trimming device which is moved axially to engage the sprocket with the driving key upon rotation of the casing about the axis of the shaft to its operative position by the manually or foot operable control device. The axial movement of the casing is obtained by providing the casing with an axially extending projection which engages a similar shaped slot formed on the casing of the lawn mower, whereby relative rotation of the parts moves the projection of the edge trimming device casing out of the slot in the lawn mower casing to move the trimming device axially along the driving shaft.

In order that the invention may be clearly understood some preferred embodiments will now be described by way of example with reference to the accompanying drawings, in which:

FIGURE 1 is a side elevation of a lawn mower provided with an edge trimming attachment fitted on the outside of the mower frame in front of the main cutter shaft, the attachment being shown in its lowered operative position with an inoperative raised position shown in dot-and-dash lines;

FIGURE 2 is a side elevation of the edge trimming device to an enlarged scale;

FIGURE 3 is a plan view of the edge trimming device as shown in FIGURE 2;

FIGURE 4 is a section taken on the line 4—4 of FIGURE 2 but with the additional ground roller removed;

FIGURE 5 is a part side elevation of a modified form of edge trimming device;

FIGURE 6 is a plan view of the edge trimming device as shown in FIGURE 5;

FIGURE 7 is a sectional elevation of the drive mechanism for the edge trimming device with the parts shown in their inoperative or raised position;

FIGURE 8 is a sectional view similar to that of FIGURE 7 but showng the parts of the drive mechanism in their operative or lowered position;

FIGURE 9 is a diagrammatic view showing the cam device of the drive mechanism in its inoperative position;

FIGURE 10 is a similar diagrammatic view showing the cams of the drive mechanism in the operative position; and FIGURE 11 is a sectional view of a modified drive mechanism which is shown in its operative or lowered position of the trimmer and which includes a universal coupling.

Referring now to the drawings and in particular to FIGURES 1 to 4 there is shown a lawn mower provided with an edge trimming attachment which is mounted externally of the frame of the lawn mower and in front of the main cutter shaft.

In FIGURE 1 the lawn mower 10 comprises two side plates one of which is shown at 11, spaced apart by the usual transverse bracing members 12 which are adapted also to support the usual handle mechanism generally indicated by the reference numeral 13. The usual large land roller 14 is mounted between and journalled in the side frames 11 and drives through a chain and sprocket mechanism 15, a horizontal multi-helical bladed grass cutter 16 mounted on a rotatable shaft 17. The grass cutter 16 co-operates with the usual ledger blade 18 the position of which may be adjustable in accordance with any desired means. For example, the adjustment between the grass cutter 16 and the ledger blade may be accomplished by means of one or more screws attached to the grass deflecting plate (not shown) and which pass through a transverse bracing member and are clamped in position by hand nuts on either side of the transverse member. The usual mechanism of the lawn mower is completed by the front small diameter roller 19.

The lawn mower 10 is provided with an edge trimming device which comprises an enclosed casing 20 containing a chain and sprocket drive for operating the cutters of the trimming device from the main cutter shaft 17. The chain and sprocket drive comprises a sprocket 21 keyed on the main cutter shaft 17 and driving a sprocket 22 through a chain drive 23. The sprocket 22 is mounted on the auxiliary cutter shaft 24 carrying the edge trimming cutter, shown generally by the reference numeral 25. The edge trimming cutter 25 is shown more clearly in FIGURE 2 of the drawings and it will be seen that it consists of a number of blades 26 made of sharpened flat bars equally spaced around the auxiliary cutter shaft 24. The edge trimming cutter 25 is mounted within a casing 27 which forms part of and is attached to the rear of the casing 20 by means of a plurality of connecting members 28. The blades 26 of the edge trimming cutter 25 co-operate with a ledger blade 29 which forms part of an extension of the casing 27. The auxiliary cutter shaft 24 is mounted in suitable bearings in the casing 20 and the casing 27 and it will be seen from FIGURE 4 of the drawings that the cutter 25 is provided with an extension 30 supporting the shaft 24, the extension being provided with an adjusting device 31 for adjusting the position of the edge trimming cutter 25 with relation to the ledger blade 29.

As shown more clearly in FIGURES 2 and 3 of the drawings the upper surface 32 of the casing 20 is provided with a plate 33 secured thereto by a pair of connecting members 34. The front end of the plate 33 has secured thereto by means of the front connecting member 34 a forwardly and downwardly extending support arm 35. Although the support arm is attached rigidly to the casing 20 by means of the connecting member 34 it may, of course, be formed integrally therewith. The lower front end 36 of the arm 35 is turned outwardly or extended sideways to provide an extension 37 as shown more clearly in FIGURE 3 of the drawings. This extension 37 is intended to lie flat over the edge of the lawn which is shown by chain lines 38 in the drawings. In conjunction with roller 49, to be hereinafter described, the extension 37 thereby provides a stop means which, in fact, determines the operative lowered position of the auxiliary cutting assembly.

The front portion 36 of the support member is also bent upwardly at 39 to provide a guide surface running over the edge of the lawn. Furthermore, the front portion 36 of the arm 35 may be provided with a longitudinal side plate 40 which extends downwardly to form an additional surface fitting against the edge 38 of the lawn. It will be seen that the side plate 40 is bent outwardly at its front edge 41 to provide a guide surface. In this way the operator can move the guide portion of the support member 35 along the lawn edge which thereby determines the operation and efficiency of the edge trimming device.

It will be appreciated that the casing 20 of the auxiliary cutting assembly forms in effect an arm rotatable about the main cutter shaft 17. It will be appreciated that when the casing 20 is in its lowermost operative position as determined by the engagement of the arm 35 with the edge of the lawn, the trimming device will be located for cutting the edge of the lawn simultaneously with the cutting of the main surface by the main helical cutter 16. In order to render the edge trimming attachment inoperative the casing 20 is rotated clockwise as seen in FIGURE 1 to the position shown in dot-and-dash lines. In this inoperative position it will be appreciated that the auxiliary cutter 25 is raised clear of the ground surface and is therefore idly rotated until required again by the operator. The raising operation for the edge cutting attachment comprises a control 44 on the handle of the lawn mower which is connected with the casing 20 by means of a Bowden cable 45. The handle 44 is provided with a locking lever 46 for retaining the mechanism in its inoperative position. The lower end of the Bowden cable 45 passes through a guide member 47 on the casing of the lawn mower and the cable is connected to a U-shaped member 48 pivotally connected to the casing of the trimming device at 48'. The operation of the raising mechanism by the operator is merely a direct pull on the casing 20 to pivot the casing clockwise about the main cutter shaft 17 to its inoperative raised position. Release by the operator of the handle 44 lowers the casing 20 until the lower surface of the front guiding arm 35 engages the edge of the lawn.

Frequently the earth adjacent the lawn edge varies in height. In some cases the earth is practically the same height as the lawn surface and to avoid "digging" of the auxiliary cutting assembly a further support member is provided extending downwardly from the edge of the casing 20 so as to engage the surface of the earth adjacent the lawn edge. A suitable support member is shown in FIGURES 2 and 3 of the drawings by the roller 49 which is carried by the bent arm 50 rigidly secured to the casing 20 by the connecting members 51. The depth of this second support member is predetermined to fit the position of the cutting assembly and it will be appreciated that the casing will be raised if the earth level approaches the surface of the lawn. It will, of course, be appreciated that the support roller 49 may be formed integrally as part of the front support arm 35, for example it may merely depend from the turned over edge of the support arm 35. The roller 49 therefore, enables the trimmer to cut the grass when the lawn edge varies in height, or the earth adjacent the lawn edge varies in height, or the lawn edge is not very deep.

As previously mentioned the edge cutting device would normally rotate idly in its inoperative raised position. However, the preferred drive mechanism for the auxiliary cutting device preferably includes an arrangement whereby the drive for the cutter 25 is rendered inoperative as the casing 20 rotates to its inoperative position. This drive mechanism for the sprocket 21 from the main cutter shaft 17 is shown generally in FIGURE 3 by the reference numeral 55 and it will be described hereinafter in greater detail with reference to FIGURES 7 and 8 of the drawings.

Referring now to FIGURES 5 and 6 of the drawings there are shown possible modified arrangements of the construction previously described with reference to FIG-URES 1 to 4.

In the embodiment of the invention as shown in FIGURES 5 and 6 of the drawings the front guiding and support arm 35 is secured as before to the plate 33 on the casing 20 of the edge trimming device of the lawn mower. As shown in FIGURE 6 of the drawings the plate 35 is inclined downwardly and at the same time it is bent so that the vertical positioning plate 40 is correctly positioned against the lawn edge so that the cutter blades 26 are correctly positioned to trim the edge of the lawn. In the present embodiment as shown in FIGURE 5 the vertical plate 40 extends also upwardly above the level of the lawn so that the plate when viewed in side elevation as seen in FIGURE 5 is substantially oval in shape with the front edge bent inwardly as at 41 to provide a guiding edge. The upper half of the plate 40 is provided with a support roller 60 which is mounted on a shaft 61 and secured thereto by a nut 62. The shaft 61 extends through the plate 40 and is rigidly secured thereto by means of the nut 63. The roller 60 is correctly positioned in relation to the plate 40 so as to provide a proper support for the edge trimming device whereby the blades 26 on the cutter assembly 25 are correctly positioned to cut the edge of the lawn when the casing 20 is in its lowered operative position.

As an alternative arrangement to the provision of the front guiding and support arm 35 together with the plate 40 and the support roller 60 or the support plate 37, it is possible to provide a suitable support for the casing 20 by providing the roller 64. This roller is mounted on the shaft 65 and secured thereto by the nut 66. The shaft 65 extends through the casings 27 and 20 and is secured thereto by the nut 67 which is mounted on the threaded end of the shaft 65. The roller 64 is correctly positioned in relation to the casings 27 and 20 so as to maintain the edge trimming device correctly in position in relation to the upper surface of the lawn. The provision of the roller 64 has the considerable advantage in that the roller is positioned more closely to the auxiliary cutter shaft 24 so that the cutter 25 more closely follows the immediate undulations of the lawn surface as sensed by the roller 64.

In the embodiments as described with reference to FIGURES 1 to 6 it will be appreciated that the guiding or supporting plates and/or the guiding and supporting rollers are all fixedly mounted in relation to the casing of the edge trimming device. It is, however, within the scope of the invention to mount the guiding and supporting plates and/or rollers adjustably on the casing of the edge trimming device so that the position of the plates and/or rollers can be varied to suit various trimming positions for the lawn mower. It is also within the scope of the invention to provide wheels or other devices instead of the rollers as shown in FIGURES 2, 5 and 6 of the drawings.

Referring now to FIGURES 7 and 8 of the drawings there is shown a drive mechanism 55 as hereinbefore mentioned for transmitting the drive from the main cutter shaft 17 to the auxiliary cutter shaft 24. The particular drive mechanism as shown in FIGURES 7 and 8 is automatically rendered inoperative when the casing 20 is moved upwardly to its inoperative position by means of the manual control 44. Likewise the drive mechanism is automatically rendered operative when the operator manipulates the handle 44 to permit the casing to move to its operative position in which the support plate 36 or the equivalent rollers engage the upper surface of the lawn adjacent the edge 38, or roller 49 engages earth or path adjacent the lawn edge.

The edge trimming device includes a driven shaft 70 which is keyed or otherwise coupled with the main cutter shaft 17 of the lawn mower. As shown in FIGURES 7 and 8 the shaft 70 is provided with a threaded end 71 which threadably engages within the main cutter shaft 17. The cutter shaft 17 is provided with the main cutter blades 72 and the coupled shafts 17 and 70 are rotatably supported in a bearing 73 in the casing 11 of the lawn mower. The shaft 70 of the edge trimming device extends through a cam plate 74, which is either integral with the plate 11 of the lawn mower or as shown is formed separately and is secured thereto by connecting members 75.

The cam plate 74 is of dished construction and is formed with an annular outwardly extending flange 76. The flange 76 is formed at two diametrically positioned points with horizontal slots or grooves which are of V cross section as shown by the reference numeral 77 in FIGURE 8.

The casing 20 of the edge trimming device is provided with a plate 78 which has an axial extension 79 mounted within the extension 80 of the casing 20 and also forming a support for the driven shaft 70. The plate 78 is fixedly secured to the casing 20 and is thereby rotatable therewith. The plate 78 is circular in shape and corresponds to the configuration of the cam plate 74. As shown more particularly in FIGURE 8 of the drawings the plate 78 is provided with a V shaped projection or extension 81 which extends diametrically across the plate so that its outer portions normally correspond and are located within the V-shaped slots 77 in the inoperative position of the edge trimming device as shown in FIGURE 7. The arrangement as described above is that the plate 78 rotates with the casing 20 as the casing moves to its lowermost operative position as shown in FIGURE 8 and as this movement occurs the V-shaped projection 81 is rotated relatively to the slots 77 in the plate 74 so as to cam the projection 81 outwardly which thereby moves the casing 20 of the edge trimming device axially away from the lawn mower for a purpose to be hereinafter described.

The driving sprocket 21 mounted within the casing 20 of the edge trimming device is located about the driven shaft 70 but is normally not in driving engagement therewith. The casing 20 is provided with an inwardly directed annular extension 82 which engages the side surface of the sprocket 21 so that when the casing 20 is moved axially to the right as seen in FIGURE 7 due to rotation of the casing to its operative position, the sprocket 21 is also moved axially relative to the driven shaft 70 and this movement is utilised to engage the sprocket 21 with the driven shaft 70. The shaft 70 is provided with a driving key 83 which extends axially through the shaft 70 in a slot 84 which is wide enough to permit movement of the key 83 relative to the shaft 70 in the axial direction of the shaft. As the sprocket 21 is moved axially by the extension 82 of the casing 20 it engages the driving key 83 within a corresponding keyway 85 in the sprocket so that the drive is transmitted to the sprocket to operate the edge trimming device.

The end of the driven shaft 70 is provided with a cap 86 which is attached thereto by a bolt 87 threadably engaging a central bore formed in the end of the driven shaft 70. The inner end 88 of the bolt 87 forms a seating for a relatively light spring 89 the other end of which seats against the key 83 extending through the slot 84 in the driven shaft 70. The provision of the spring 89 permits movement of the key 83 in an axial direction relative to the driven shaft 70 and this movement is necessary to take care of possible misalignment of the key 83 with the keyway 85 in the sprocket 21 as the parts are drivably engaged due to axial movement of the casing 20. As the key 83 rotates with the driven shaft 70 the key will properly align itself with the keyway 85 and will thereafter engage within the keyway 85 in response to the action of the spring 89 within the bore 90 of the driven shaft 70.

The cap 86 furthermore forms a seating for a larger spring 91 which is located externally of the driven shaft 70 and which engages an annular spring plate 92 slidably abutting the outer surface of the casing 20 of the edge trimming device. The purpose of the spring 91 is to return the edge trimming device to its inoperative position as the edge trimming device is rotated upwardly by the manually operable control device at 44 to its inoperative position. The spring 91 ensures that the drive is discontinued so that the edge trimming device is always rendered inoperative. The spring plate 92 is keyed at 93 to the driven shaft 70 for rotation therewith but is slidably movable relative to the shaft in the axial direction so that its innermost surface which extends axially from the shaft is at all times slidably abutting the outermost surface of the casing of the edge trimming device. In the operative position the cap 86 forms a stop for the spring plate 92.

It will be appreciated that the threaded bolt 87 extending through the end cap 86 maintains the parts of the edge trimming device in operative relationship on the casing 20 of the edge trimming device and that the device can therefore be quickly taken to pieces for maintenance purposes by merely unscrewing the bolt 87 from the threaded portion of the bore 90 of the driven shaft 70.

It will, of course, be understood that the operation of the edge trimming device may be reversed so that the edge trimmer casing moves towards the lawn mower when lowered to its operating position so that the projection on the casing seats in the slot of the cam plate when the edge trimmer is operating. In such an embodiment the V slot would have to have a flat bottom to permit operation on edges which vary in height. Furthermore, the key must be mounted in the key slot in the driven shaft on that side of the sprocket adjacent the lawn mower and the light spring must also be mounted in a bore in that shaft on the same side to ensure engagement of the key in the keyway of the sprocket. Further modifications include the provision of the cam slot on the casing of the edge trimmer, while the projection is formed on the casing of the lawn mower. Any suitable shapes can be used for the slots and projections so long as a camming action is obtained upon relative movement of the parts, e.g. a flat bottomed V-shaped slot could be used. The preferred shape is, however, the V-shaped design as shown in FIGURES 7 and 8 and as illustrated more clearly in FIGURES 9 and 10 which illustrate diagramatically the movement of the cam plate 74 and the plate 78 as the casing 20 is moved from its inoperative to its operative position.

Referring now to FIGURE 11 of the drawings there is shown an arrangement whereby the drive mechanism may be modified so as to permit the edge trimming device to maintain its position with the cutter blades 25 square with the edge of the lawn irrespective of any rocking movement of the lawn mower in a plane at right angles to the direction of travel of the lawn mower. This is obtained by providing a universal joint or similar connection as part of the coupling between the main cutter shaft 17 and the driven shaft 70 of the edge trimming device. As shown in FIGURE 11 the universal joint shown generally by the reference 98 forms in effect part of the driven shaft assembly 70 and the end part 70A of the driven shaft 70 is then coupled by the previously mentioned screwed connection with the main cutter shaft 17 in the casing of the lawn mower.

The universal joint 98 as provided in the drive mechanism permits the complete trimming device to rock relatively to the lawn mower in a direction at right angles to the fore and aft direction. In order to permit this movement the slots 77 in the cam plate 74 with the stop/start mechanism of FIGURES 7 and 8 must be located in approximately vertical direction so that the auxiliary trimming device can rock accordingly. However, the trimmer during its movement from the operative to the inoperative position moves through an angle of 20° to 30°. The position of the slots will therefore be determined by experiment and may well be at an angle of 45° to the vertical. It will, however, be appreciated that the improved drive mechanism incorporating the universal coupling 98 can be provided without the necessity of using the stop/start mechanism of FIGURES 7 and 8. With such an arrangement the slotted plate 74 is not required but a projection on one or other of the casings is necessary so that the trimmer can rock in a near vertical plane.

It will be appreciated that the invention provides a simple arrangement for supporting the edge trimming device of a lawn mower in its operative position. The device not only supports the edge trimming device but also adjusts the trimmer automatically in accordance with modulations of the lawn surface as the mower is operated. The device also provides a guiding means for maintaining the edge trimming device correctly in position against the edge of the lawn. The invention furthermore provides an improved drive mechanism whereby the edge trimming device is automatically rendered operative or inoperative as the edge trimming device is moved to its lowered or raised positions by the operator. Furthermore, the invention provides a modified drive mechanism whereby the edge trimming device can be operated successfully to maintain the trimmer blades square with the edge of the awn irrespective of rocking movement of the awn mower in a direction transverse to the cutting direction.

I claim:

1. A lawn mower comprising a main cutter shaft, a main driving shaft, an auxiliary cutting assembly, driving means for said cutting assembly coupled with said main cutting shaft for actuation thereby, a casing for said auxiliary cutting assembly, said casing being rotatably mounted about the axis of one of said shafts for movement from a raised inoperative position to a lowered operative position of the edge trimming device, a device for controlling the movement of the said casing about the axis of said shaft, and a support member attached to the casing of said auxiliary cutting assembly for engaging along and over the edge of the lawn for determining the position of the auxiliary cutting assembly in relation to the lawn edge irrespective of variations in movement of the lawn mower, said support member comprising a plate extending forwardly from the casing of the auxiliary cutting assembly and formed with a horizontal guiding and support portion extending over the edge of the lawn and a vertical positioning plate fitting against the edge of the lawn.

2. A lawn mower as claimed in claim 1, wherein the front edges of the horizontal guiding and support plate and the vertical positioning plate are both curved outwardly to act as a guide means for the said support member.

3. A lawn mower comprising a main cutter shaft, a main driving shaft, an auxiliary cutting assembly, driving means for said cutting assembly coupled with said main cutting shaft for actuation thereby, a casing for said auxiliary cutting assembly, said casing being rotatably mounted about the axis of one of said shafts for movement from a raised inoperative position to a lowered operative position of the edge trimming device, a device for controlling the movement of the said casing about the axis of said shaft, and a support member attached to the casing of said auxiliary cutting assembly for engaging along and over the edge of the lawn for determining the position of the auxiliary cutting assembly in relation to the lawn edge irrespective of variations in movement of the lawn mower, said support member comprising a plate extending forwardly from said casing, and a supporting roller provided at the front end of said plate.

4. A lawn mower as claimed in claim 3, in which the support member is also provided with a substantially vertical positioning plate for engaging the side edge of the lawn during operation of the edge trimming device.

5. A lawn mower comprising a main cutter shaft, a main driving shaft, an auxiliary cutting assembly, driving means for said cutting assembly coupled with said main cutter shaft for actuation thereby, a casing for said auxiliary cutting assembly, said casing being rotatably mounted about the axis of one of said shafts for movement from a raised inoperative position to a lowered operative position of the edge trimming device, a device for controlling the movement of the said casing about the axis of said shaft, a support member attached to the casing of said auxiliary cutting assembly for engaging along and over the edge of the lawn for determining the position of the auxiliary cutting assembly in relation to the lawn edge irrespective of variations in movement of the lawn mower, and a universal coupling mounted between the main cutter shaft and the driving means for said cutting assembly, said driving means having a sprocket mounted thereon and drivably connected with the auxiliary cutting assembly.

6. A lawn mower comprising a main cutter shaft, a main driving shaft, an auxiliary cutting assembly, a driving means for said cutting assembly coupled with said main cutter shaft for actuation thereby, a casing for said auxiliary cutting assembly, said casing being rotatably mounted about the axis of one of said shafts for movement from a raised inoperative position to a lowered operative position of the edge trimming device, a device for controlling the movement of the said casing about the axis of said shaft, and a support member attached to the casing of said auxiliary cutting assembly for engaging along and over the edge of the lawn for determining the position of the auxiliary cutting assembly in relation to the lawn edge irrespective of variations in movement of the lawn mower, a driving key mounted on said driving means, a sprocket mounted on said driving means for movement relatively thereto and adapted for driving engagement with said driving key, means for moving said casing axially to engage said sprocket to effect such driving engagement, said axial movement of the casing being effected by rotation of said casing from its inoperative to said operative positions by the manual or foot control device, said axially movable means comprising a cam device mounted between said casing and a side plate of said lawn mower.

7. A lawn mower comprising a main cutter shaft, a main driving shaft, an auxiliary cutting assembly, driving means for said cutting assembly coupled with said main cutter shaft for actuation thereby, a casing for said auxiliary cutting assembly, said casing being rotatably mounted about the axis of one of said shafts for movement from a raised inoperative position to a lowered operative position of the edge trimming device, a device for controlling the movement of the said casing about the axis of said shaft, a depth regulating roller attached to said casing to engage the surface adjacent the edge of the lawn, a support member attached to the casing of said auxiliary cutting assembly for engaging along and over the edge of the lawn for determining the position of the auxiliary cutting assembly in relation to the lawn edge irrespective of variations in movement of the lawn mower, said support member comprising a bar extending forwardly from said casing, and means on the free end of said bar adapted to engage the lawn.

8. A lawn mower as claimed in claim 6, having a slotted plate attached or formed integrally with a side plate of said lawn mower, a plate movable with said casing of the edge trimming device and co-operating with said slotted plate, said second plate having a projection thereon normaly engaging the slots in said slotted plate in the inoperative position of said edge trimming device.

9. A lawn mower as claimed in claim 8, wherein the driving key is mounted for axial movement in said driven shaft of the edge trimming device so as to permit axial engagement of the parts due to misalignment of the driving key with a driving slot in the sprocket of the edge trimming device, resilient means being provided to urge said driving key axially into driving engagement with said sprocket at all times.

References Cited by the Examiner
UNITED STATES PATENTS 1,770,434 7/30 Schleicher _____ 56—25.4
2,058,249 10/36 Nemethy _____ 172—16

FOREIGN PATENTS 840,723 7/60 Great Britain.

ANTONIO F. GUIDA, *Acting Primary Examiner.*
T. GRAHAM CRAVER, RUSSELL R. KINSEY,
*Examiners.*